(12) United States Patent
Querol Borràs et al.

(10) Patent No.: US 9,596,610 B1
(45) Date of Patent: Mar. 14, 2017

(54) SYSTEM AND METHOD FOR DETECTING AND ELIMINATING RADIO FREQUENCY INTERFERENCES IN REAL TIME

(71) Applicant: Universitat Politécnica de Catalunya, Barcelona (ES)

(72) Inventors: Jorge Querol Borràs, Barcelona (ES); Adriano José Camps Carmona, Barcelona (ES)

(73) Assignee: Universitat Politécnica de Catalunya, Barcelona (ES)

( * ) Notice: Subject to any disclaimer, the term of this patent is extended or adjusted under 35 U.S.C. 154(b) by 0 days.

(21) Appl. No.: 15/222,036

(22) Filed: Jul. 28, 2016

(51) Int. Cl.
| | |
|---|---|
| *H04W 84/06* | (2009.01) |
| *H04W 16/22* | (2009.01) |
| *H04W 48/06* | (2009.01) |
| *H04B 7/185* | (2006.01) |
| *H04L 5/14* | (2006.01) |
| *H04L 5/22* | (2006.01) |

(52) U.S. Cl.
CPC ........ *H04W 16/22* (2013.01); *H04B 7/18515* (2013.01); *H04L 5/14* (2013.01); *H04L 5/22* (2013.01); *H04W 48/06* (2013.01); *H04W 84/06* (2013.01)

(58) Field of Classification Search
CPC .................................................... H04W 84/12
See application file for complete search history.

(56) References Cited

U.S. PATENT DOCUMENTS

2009/0136104 A1\* 5/2009 Hajian .................. G01R 33/56
382/128

OTHER PUBLICATIONS

Querol et al. "Assessment of Back-End RFI Mitigation Techniques in Passive Remote Sensing", 2015 IEEE International Geoscience and Remote Sensing Symposium, IGARSS 2015, Jul. 26-31, 2015, p. 4746-4749, Jul. 2015.

\* cited by examiner

*Primary Examiner* — Bobbak Safaipour

(57) ABSTRACT

The present invention relates in general to communications and navigation systems and methods. In particular, the invention relates to a method and a system for detecting and eliminating radio frequency interferences in real time and more explicitly those related to satellite navigation systems. The invention is based on the application of a combination of techniques based on time domain, frequency domain, scale domain and statistical methods.

11 Claims, 3 Drawing Sheets

SYSTEM AND METHOD FOR DETECTING AND ELIMINATING RADIO FREQUENCY INTERFERENCES IN REAL TIME

FIELD AND BACKGROUND OF THE INVENTION

The present invention relates in general to communication and navigation systems and methods. In particular, the invention relates to a method and a system for detecting and eliminating radio frequency interferences in real time, and more explicitly related to satellite navigation systems.

Today the use of the electromagnetic spectrum is becoming increasingly more intense due to the enormous amount of wireless devices. This fact has driven the generalization of the problem of the radio frequency interferences (RFI). RFI are signals which degrade or prevent the correct functioning of any instrument which uses wireless communications.

Due to the generalization of the navigation applications, especially in the environment of global navigation satellite systems (GNSS), RFI are becoming a serious problem due to the critical consequences, mainly, in terms of security and reliability. However, the impact not only relates to navigation, but also to the availability of the GNSS signals used for synchronizing critical infrastructures, such as for example telecommunications, energy transport and bank transaction networks and also, more recently, in earth observation systems which use the signals of GNSS as signals of opportunity.

In a wide sense, when GNSS is referred to, they include all the global or regional systems. The most used and the ones that stand out are the United States global position system (GPS), the Russian GLONASS, the European Galileo, or the Chinese Beidou. In any case, any other satellite navigation system of those which are in development (QZSS, IRNSS, . . . ) or which could be launched in the future would be within the scope of the present invention.

In recent years, a series of signal processing methods for detecting and eliminating RFI signals has been developed, originally in the field of radio astronomy and more recently in earth navigation and observation applications, mainly microwave radiometry and GNSS-R reflectometry.

In spite of the GNSS signals having inherent protection from the RFI signals owing to the widened spectrum modulations used, generally, said techniques are not sufficiently robust so as to suitably treat the interferences. Furthermore, the extremely low strength of the GNSS signals which arrive to the Earth's surface, far below the noise level, makes them very sensitive and vulnerable to the presence of any interference, whether from intentional or intentional origin.

The most common origins of unintentional interferences could be classified into lower harmonic frequency bands, intermodulation products (IMP), broadband signal overlapping or out-of-band emissions. All of these can easily affect the signals of GNSS, causing the desensitizing of the receiver. Another example of unintentional RFI are the aerial radio navigation signals which, either share the same frequency band as some of the GNSS signals, or operate in bands adjacent to these. Some examples of said signals are DME (distance measuring equipment), TACAN (tactical air navigation system), ADS (automatic dependent surveillance), Link 16, radar systems (land or orbital), amateur radio emissions, mobile communications, satellite communications or MSS (mobile satellite services). In addition, other electronic devices such as computer components, digital buses, etc., can also cause interference in an unintentional manner.

With respect to the intentional interferences, they normally correspond to elements or devices specifically designed for interfering or disrupting a determined frequency band. Said devices are also known as jammers. These can operate at one or different bands protected a priori and are usually cheap and easily accessible which can pose a serious security problem in navigation and especially in military applications. These disrupting devices would include the devices known as personal privacy devices (PPD) which have proliferated alarmingly in recent years and therefore have aggravated the problem of RFI. These devices deliberately transmit signals in the frequencies which use GNSS or close to them in order to thereby make the GNSS unusable within an area around the PPD.

The effect of the RFI on the radio frequency receivers is translated into bad functioning of the same. When there are disruptions in the same GNSS band, the equivalent noise level increases and the receiver is desensitized. In addition, when the interference is in a band adjacent to those used in GNSS, the reception chain may end up being saturated, disabling the selective rejection achieved by means of the use of filters tuned in the functioning band of the receiver.

GNSS have not only become a key technology in navigation and positioning, being used in all types of means of transportation (land, maritime, aerial, etc.), but they are also used in other critical applications and emergency services for the communication and synchronization thereof (for example police teams, firefighters or rescue teams). In addition, the high stability of the reference clocks used in the satellites of said systems allows the synchronization of nodes in any network, including for high-precision applications, including electrical transmission networks, radio diffusion and telecommunications networks, astronomical observations and even temporal marks in bank transactions.

In summary, there are three main reasons which support the development of techniques for combatting the threat of RFI. Firstly, the power level of the GNSS signals is intrinsically weak. Furthermore, the RFI signal power sources can be very different in nature and given the increase in the use of the radioelectric spectrum, the RFI signal presence is increasingly more common. Lastly, the increasingly larger number of critical applications based on GNSS means it is necessary to address the problem, not only in terms of the detection and localization thereof, but also the suppression thereof to contribute to the fact that GNSS can be considered sufficiently robust so as to support all types of applications and services.

Among the methods of analysis and elimination of RFI mentioned, those based on the time domain, the frequency domain, on statistical analysis of the signal received or on the spatial adaptive filtering are the most relevant, and therefore, the most used. Some of these techniques have already been applied in systems in real time, but do not offer high rejection against RFI, either they are designed for a particular case of RFI, such as for example continuous frequency signals, or sinusoidal frequency signals (CW, continuous wave) or also frequency modulated (FM or chirp) signals. There are also other methods based on adaptive antennas and antenna groupings, especially intended for military applications, but they are not the object of the present invention.

The treatment of the RFI is approached from the point of view stochastic processes, therefore the RFI detection algorithms are based on the Neyman-Pearson criterion hypothesis, where a value is defined for discriminating between signal samples contaminated with RFI and clean samples. Using this criterion, a compromise is achieved between the probability of detecting the RFI correctly (probability of detection) and the probability of eliminating the data erroneously detected as RFI (probability of false alarm).

Generally, in this detection method, the coexistence of RFI and desired signal are analyzed in difference domains or spaces, whether in the time domain, frequency domain or in both at the same time and then using this information to eliminate the interference of the useful signal received.

In the time domain, the samples of the signal received are compared directly with a threshold value. Samples lower than the threshold are considered free of RFI and samples with a larger amplitude are "marked" as contaminated by RFI. These algorithms are effective when there are short bursts of high power located in time, this is why this method is called the "pulse blanking" method. However, sinusoidal signal interferences (CW), if they are detected in this manner, lead to the complete blanking of the signal itself.

In the frequency domain, the amplitude of the signal in each frequency is compared, as in the previous case, with a threshold value. The signal received is then processed with a digital filter, the transmission zeros of which are established in the frequencies in which the RFI are located. This method is generally called notch filtering and is the opposite of pulse blanking since it can easily detect sinusoidal interferences, but does not take into account the temporal evolution of the same.

Lastly, the methods that combine analysis in the time domain and in the frequency domain have the advantage of being capable of detecting and distinguishing between the interferences both of continuous wave and pulsed wave because they have a certain temporal and frequency resolution.

However, the resolution in said domains is related and limited by the so-called Gabor limit, the principle of uncertainty in the context of the processing of the signal. Two examples of this type of analysis are short-time Fournier transform (STFT) and wavelet transform (WT).

STFT is a representation of the signal in the domains of time and frequency with a given resolution in each one of these. This means that the pulsed RFI signals can be detected based on a duration determined by the time resolution, but not shorter, and an infinite number of contaminated frequency bands can be distinguished, determined by the frequency resolution. There are various forms of implementing STFT, which are dependent on the application. Among these, filter banks or fast Fournier transform are distinguished.

In addition, the wavelet transform (WT) has the advantage of being able to provide analysis with multiple resolution, but in turn, the implementation thereof is usually more complex. As in the previous case, a threshold value discriminates between clean data and data contaminated with RFI, but in this case, it must be carried out for each sample in the time-scale space.

In addition, there are statistical methods. Both the interferences, RFI and the useful signal, are assumed independent stochastic processes and have statistical properties which can be used for distinguishing between them. In order to achieve this aim, the RFI and the desired signals should not follow identical statistical distributions. In this case, the Neyman-Pearson criterion can be applied in the sense that a sample is correctly detected when it has been determined that it belongs to the corresponding statistical distribution thereof. In contrast, it is considered a false alarm when it has been erroneously determined that said sample belongs to a statistical distribution. This selection can be carried out according to different parameters. For example, two of these are called: central moments and the normality test.

The central moments of the signal received can help to detect RFI, in particular, the second and the fourth order can be very useful. If the signal has a statistical average equal to zero, the second central moment or variance is directly the average of the power of the signal and the square root thereof, the standard deviation, is related to the amplitude or scale of the signal.

The main problem with this approach is the calculation of the standard deviation of, for example, the desired clean signal with respect to the signal received contaminated with RFI. In order to resolve this, the value of the standard deviation can be obtained from robust estimates such as the median absolute deviation or the interquartile range which provide results less affected by the atypical values or outliers. The fourth central moment is related to the normality tests.

Normality tests are focused on finding out if a set of samples belongs or is similar to the normal statistical distribution. If only one of the distributions is normal, these tests can help to distinguish samples free of RFI and contaminated samples.

Kurtosis is a statistical parameter based on the relation between the fourth moment with respect to the square of the variance. This statistical parameter has the property of having a value equal to 3 for the signals with normal distribution and generally it is different from 3 for non-Gaussian signals. Other normality tests are Shapiro-Wilk, Anderson-Darling, Chi-square and Jarque-Bera for example.

In spite of the majority of the mathematical algorithms and models being well known in signal processing theory, the real challenge is to find the way of combining them with each other with the aim of implementing a system which maximizes the detection and elimination of RFI without having an a priori knowledge of the interfering signal.

The patent application WO-2012105747-A1 presents a system and a method which has a signal receiver for converting a positioning signal from a satellite received by an antenna into a digital intermediate frequency (IF) signal. A signal generator in series produces signals in series by commutation of the digitalized intermediate frequency signal. An interference canceller which distributes the signals in series after eliminating the interference of the signals in series. A satellite navigation receiver which receives the series distributed signals. A signal generator in parallel which produces the output signal in parallel which passes to an output terminal. This system and method only work with signals in the time domain or in the frequency domain and is only focused on RFI signals in modulated frequency (FM).

The U.S. Pat. No. 7,660,374-B2 proposes digitalizing the signal from the satellite, carrying out a transformation, identifying the interferences based on a certain threshold to eliminate said interferences and reconstructing the signal once again. Using this method, the interferences, both of broad band and narrow band and therefore the performance of the GPS signal are minimized. The main use is orientated at overcoming narrow band interferences, but it also explains how a second channel via which an additional algorithm for suppressing broad band interferences is applied.

SUMMARY OF THE INVENTION

It is necessary to offer an alternative to the state of the art which covers the gaps found in the same, particularly to have a system and a method which allows any radio frequency interference (RFI) signal, which may partially or completely degrade the performance of a receiver, device or system using the signals from the GNSS, to be detected and eliminated in real time.

With this aim, the present invention provides a method and a system for detecting and eliminating in real time 100 of the radio frequency interferences (RFI) which may or may not be present in an analog input signal 110 received by an antenna 200, which affect the correct functioning of the GNSS receiver 300. Said method and system comprises converting 104 said analog input signal 110 to a different frequency to that of the input signal 114, digitalizing 105 said converted analog signal 114, detecting and eliminating 106 the radio frequency interferences of said digitalized signal 115 and obtaining a digitalized signal without interferences 116 where said stages of detecting and eliminating said interferences comprise transforming 120 the digitalized signal 115 to a signal in the time domain, frequency domain, in the space of time and frequency, the space of time and scale or in the space of time, frequency and scale 130, calculating 123 the level of similarity of the signal to a variable with normal distribution 133 of said digitalized signal 115, of said transformed signal 130 or of both 115 and 130 simultaneously, where one or various normality statistical tests are used in said calculation, estimating 124 a threshold 135 to be applied in the elimination step where said threshold 135 is a function of the scale of said transformed signal 130 and/or of the result of the statistical test step 133, applying 121 said estimated threshold 135 on said transformed signal 130 and eliminating those samples of said signal 130 which exceed said threshold such that a digitalized signal without interferences 131 is obtained, transforming 122, inversely to the first conversion 120, said digitalized signal without interferences 131 and converting 107 said digital signal without interferences 116 to an analog signal without interferences 117 and where lastly said analog signal without interferences 117 is converted 108 to an analog signal 118 in the same frequency as the initial analog signal 110 coming from said antenna 200 and providing it to be used in a GNSS receiver 300.

Embodiments of the system and method of the invention are described according to the attached claims, and in a subsequent section.

The system and the method, according to the aspects of the invention previously described, present a series of advantages with respect to the previous technique, which can be summarized as follows:

It is a transparent system and a method from the point of view of the GNSS signal receiver and also independently of the type and configuration of the antenna.

The invention considerably increases the rejection and elimination of interferences (RFI) of bands adjacent to GNSS and filters and eliminates the RFI within the band of the receiver.

It effectively increases the carrier-to-noise ratio since the power of the interfering signal which causes the degradation of the same is strongly reduced owing to the increase of the rejection previously described.

The invention works in real time and can be complemented, it is compatible, with other cascade elimination algorithms.

It is completely independent of the type of GNSS, that is to say, it is applicable to GPS, Galileo, GLONASS, Beidou systems, etc.; provided these use widened spectrum modulations, as occurs in the majority of cases.

It may be tuned in order to be used in any GNSS frequency band (L1, L2, L5 . . . ) and with any type of code or service (C/A, P, M . . . ).

In the invention, each frequency band is processed like an independent processing channel or flow.

The solution reduces the power of the interfering signals produced intentionally by conventional RFI generators or jammers available on the market by more than 30 dB.

It is designed for all types of radio frequency interferences such as for example pulsed, continuous, wave, sinusoidal, modulated frequency, pulse modulated frequency (chirp), pseudo random noise (PRN).

These and other advantages will become evident from the detailed description of the invention.

BRIEF DESCRIPTION OF THE SEVERAL VIEWS OF THE DRAWINGS

The previous and other advantages and characteristics will be more completely understood from the following detailed description of embodiments, with reference to the attached drawings, which must be considered in an illustrative and non-limiting manner, in which.

DESCRIPTION OF SPECIFIC EMBODIMENTS OF THE INVENTION

The elements defined in this detailed description are provided to aid a global understanding of the invention. Consequently, the persons skilled in the art will recognize what variations and modification of the embodiments described in this document can be carried out without departing from the scope and spirit of the invention. Moreover, the detailed description of the sufficiently known functions and elements is omitted for reasons of clarity and conciseness.

Of course, the different functionalities of the invention can be implemented with different architectural variations, protocols, devices or types of applications. Any implementation presented below is included with the aim of illustrating and making the invention comprehensive and not with the intention of limiting aspects of the same.

Given the known vulnerabilities of the GNSS signals and the growing problem of the radio frequency interferences (RFI) which are capable of degrading or even interrupting the functioning of the GNSS receivers, this invention proposes a system and method for detecting and eliminating interferences. Therefore, the main objective is eliminating RFI which may cause the desensitizing of the receiver, a loss of the signal or in general poor functioning of a GNSS receiver.

Some of the current GNSS receivers on the market include simple elimination techniques, however, they are not capable of achieving the elimination levels of the proposed invention, not even with the more common signals generated by interference generators or personal privacy devices (PPD).

The invention is based on the application of techniques based on a combination of time domain, frequency domain, scale domain and statistical methods. However, the most innovating aspect thereof is the way in which these techniques are combined to maximize the rejection of the RFI signals.

Figure 1:
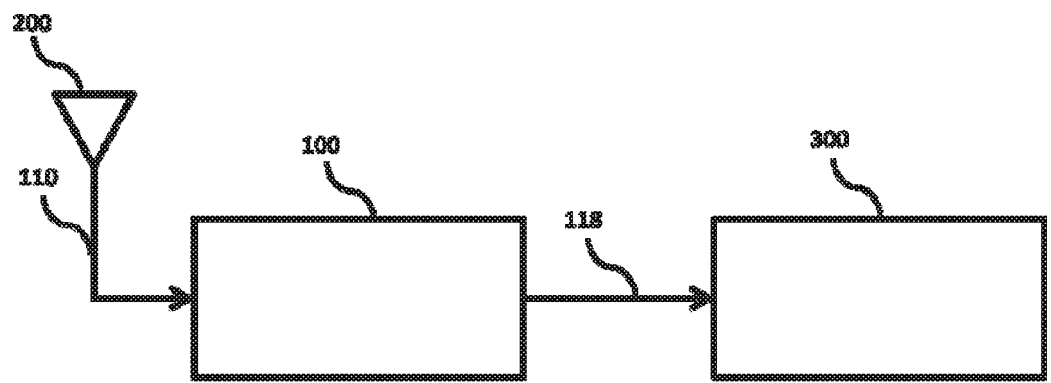
FIG. 1 schematically shows the system proposed in this invention and the relation thereof with other elements, specifically with the antenna which captures the signal with possible interferences and a GNSS receiver which receives a signal without RFI.

As is shown in FIG. 1 in general and schematically, the system object of this invention 100 is preferably placed between an antenna 200 and a GNSS receiver 300 such that the antenna 200 in the system 100 receives an analog input signal 110 from said antenna 200 which may likely contain radio frequency interferences (RFI) where said antenna 200 is arranged to capture said signal, while said system 200 finishes delivering a clean analog signal without interferences 118 to said GNSS receiver 300.

Figure 2:
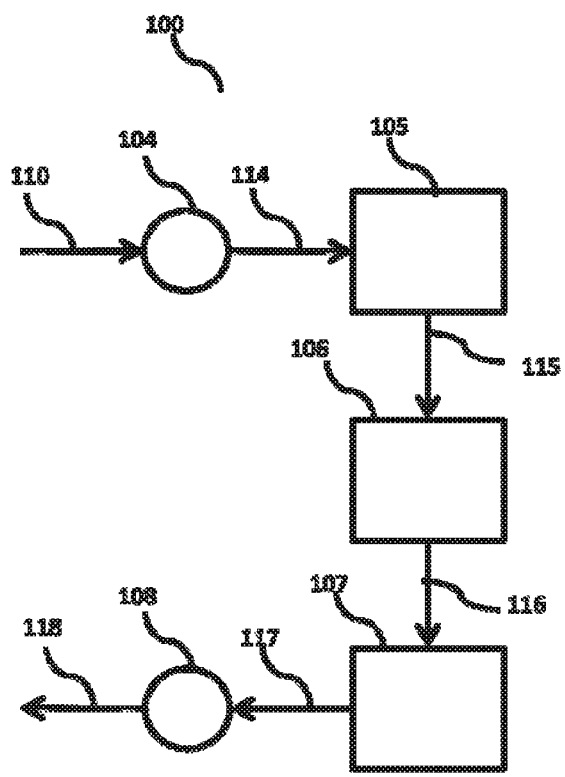
FIG. 2 shows a more detailed diagram of the essential elements and functionalities which are found within the system for detecting and eliminating radio frequency interferences in real time.

The system for detecting and eliminating radio frequency interferences 100 in real time, in a first object of the present invention, as is shown in FIG. 2, when it receives the analog signal with RFI 110, passes it through a signal converter 104 which converts the frequency of the signal received in the antenna 110 into an analog signal with a determined frequency 114, lower than that received. This new frequency is given by the type of analog-digital (ADC) 105 and digital-analog (DAC) 107 converters used in the system. These can be both ADC 105 and DAC 107 which function with intermediate frequencies (IF), like those which manage baseband (BB) signal frequencies. In this case, for example a GPS signal in the band L1 (1575.42 MHz), L2 (1227.60 MHz), L5 (1176.45 MHz), etc. will be converted to a lower frequency IF (50 MHz by way of example) or baseband (BB).

In this way, the frequency converter 104 can be implemented with a frequency mixer if the ADC 105 and DAC 107 function at intermediate frequencies (IF) while it could be implemented with a quadrature demodulator if the ADC 105 and DAC 107 work with a complex signal in BB.

This analog frequency conversion process by way of the converter 104 must be reverted at the end of the process which the system 100 applies such that the analog signal at the output of the elimination step 118 is provided to be used by a GNSS receiver 30. Therefore, this output signal 118 must be in the same frequency as the original analog signal 110 which is obtained including a second frequency converter 108 which generally increases the frequency of the signal which it receives 117.

Figure 3:
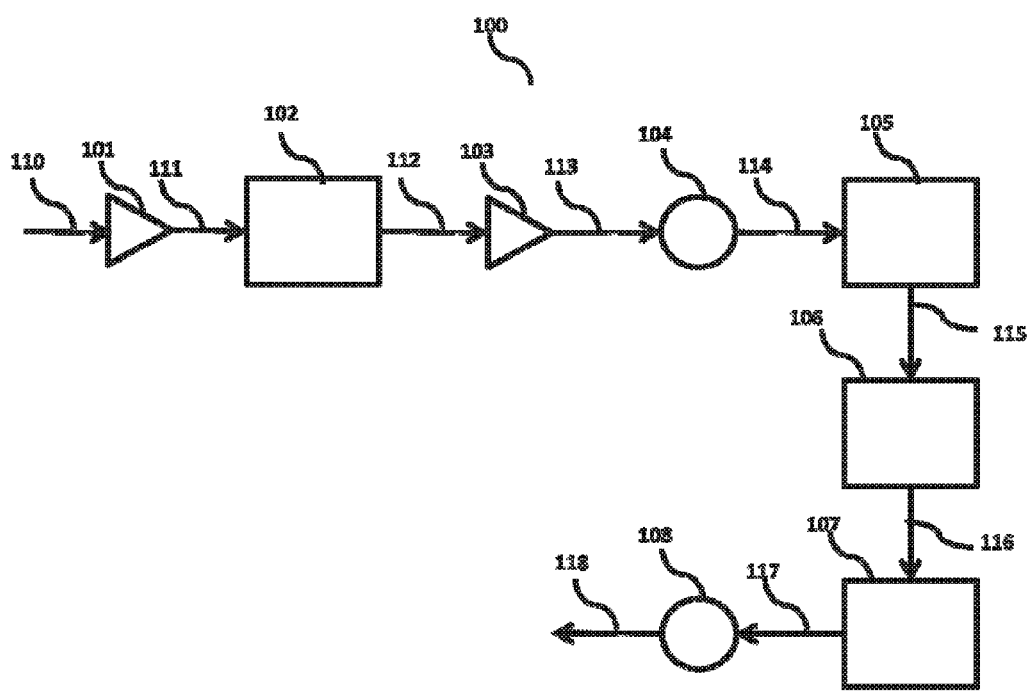
FIG. 3 schematically shows the system and functionalities where the elements necessary for the case of use are incorporated which are also needed to filter the input signal which comes from the receiving antenna.

Optionally, as is shown in FIG. 3, it may be necessary to incorporate in the system 100 a pre-amplifier 101, a signal filter 102 and an amplifier 103 when the GNSS signal captured by the antenna 110 has very low power, of the order of −80 dBm or lower and amplification prior to the frequency conversion 104 and digitalization step 105 is necessary in order to thereby maintain the amplitude of the useful signal within the dynamic margins of said steps.

The pre-amplifier 101, in this case, receives the signal with RFI 110 from the antenna 200 and pre-amplifies it 111. Said pre-amplified signal 111 is then filtered to allow only the desired frequency band 112 to pass and lastly said filtered signal 113 is amplified to a band which is admitted by the frequency converter 104.

Therefore, in this case of use, the frequency converter 104 receives an analog signal filtered to RFI 113 and amplified in a suitable band instead of directly receiving the analog signal 110 from the antenna 200.

As it has been mentioned, the analog signal modified in frequency 114 which is at an intermediate frequency (IF) or in baseband (BB) is transformed into a digital signal 115 passing through the analog-to-digital converter (ADC) 105. The digital signal generated 115 will therefore be a representation of the initial analog signal 110 at a lower frequency, filtered and digitalized, still with interferences 115.

The signal digitalized with RFI 115 is then digitally processed by a digital processing system 105 with the aim of detecting and eliminating the interferences of said signal. Although different ways of implementing this digital processing may exist, preferably for this invention, the signal processing system 106 may be implemented in real time with a field-programmable gate array (FPGA) or a digital signal processor (DSP).

Figure 4:
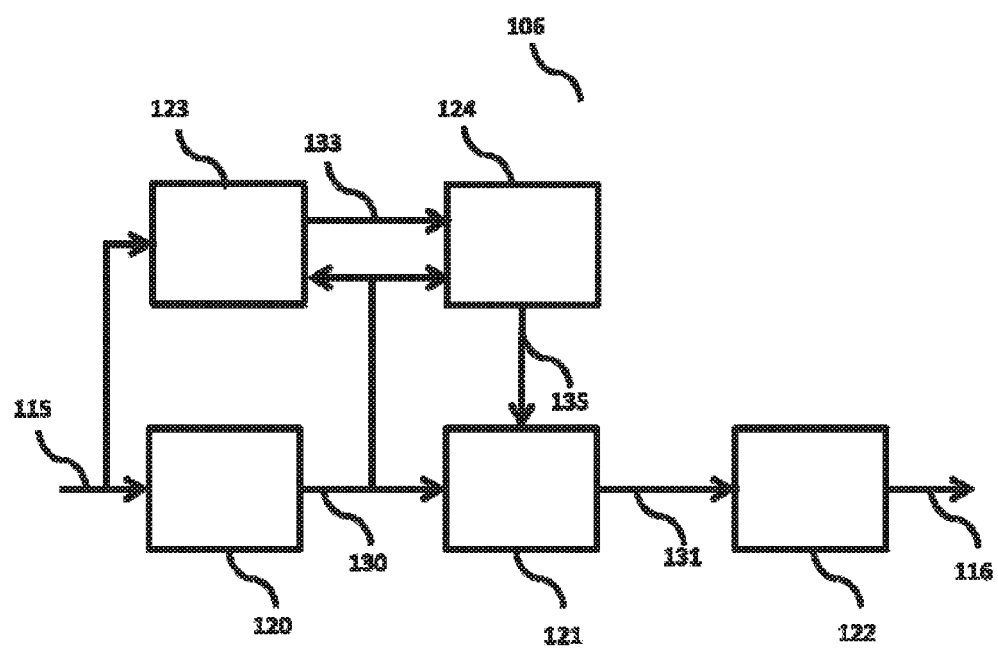
FIG. 4 shows in a particular manner the modules that intervene and the interaction thereof in the processing of the digitalized signal.

As it is shown in FIG. 4, when the digitalized signal with RFI 115 enters into said digital signal processor 106, on one hand, said signal 115 is transformed into a signal in the domain corresponding to the elimination method used such that the interferences, RFI, may be detectable. In order to carry out this transformation, different algorithms may be applied, such as for example the fast Fournier transform, wavelet transform, Karhunen-Loeve transform, principal component analysis, etc.

But preferably, in this invention, the transformation algorithm to be applied in said signal 115 is the multiresolution Fournier transform. It is an extension both of the short-time Fournier transform and the wavelet transform. While the Fournier transform carries out an analysis of the unidimensional signal, in the frequency domain, the STFT is bidimensional in the domains of time and frequency, and the WT also carries out an analysis in two dimensions, but taking into account the time and the scale; the MFT directly combines the three transforms to give a representation in three dimensions, in the space defined by the domains of time, frequency and scale. In this way, the RFI is projected into different orthogonal spaces with different ratios of time-frequency resolution. By means of said method, the probability of being a version sufficiently similar to the interfering signal received in the base of the transform is maximized so as to be able to be detected in the subsequent step, once it is compared with the corresponding transform of the useful signal.

This method, MFT, not previously used in the state of the art for eliminating RFI, has been demonstrated as having better behavior than other types of transformation and it is also compatible with the application of any of the others in a complementary manner.

As a result of applying any of these transformation algorithms, a digital signal is thus obtained in the domain or space applied in the transformation 130.

In addition, a statistical method is applied in said signal processor 106 in order to establish the distribution of signals and thus to be able to apply a criterion for discriminating the RFI from the rest of the signal. Preferably, in this invention, normality tests 123 are applied with the aim of determining whether a set of samples belong or are similar to the normal statistical distribution. This algorithm may be applied either to the digitalized signal with interferences, to the input of the module 115, or to the transformed signal in the orthogonal space 130 or to the two signals 115 and 130 simultaneously.

If the test determines that the samples under the test belong to a normal or Gaussian random variable, they are considered free of RFI, since the combination of thermal noise together with the signals of the GNSS may be accurately approximated with a random variable of said type.

In order to calculate these statistical tests 123, different methods can be applied, such as for example, in a non-limiting manner, Kurtosis, Anderson-Darling or Chi-squared. As a result, an estimation is thus obtained of the similarity of the signal 133 to a normal random variable 115, of the transform 130 or of both simultaneously, 115 and 130.

Another step or phase which the process carries out is the estimation of the threshold 124 to be applied in the elimination or elimination phase of interferences 121. Said estimation is calculated as a function of the scale of the transformed signal 130 and of the result of the statistical test 123, that is to say, of the result of the normality tests 133. In this process, the scale of the transformed signal 130 is determined by calculating the cumulative histogram or either from the modulus of the transformed signal or the instantaneous power of the same 130. As a result, said estimated threshold 135 is obtained.

Then, the stage of elimination of interferences 121 is carried out, where the estimated threshold 135 is applied to the transformed digital signal 130 such that the samples of the signal which exceed said estimated threshold 135 and which correspond to those contaminated by RFI are eliminated or modified, thus obtaining a digitalized signal clean of interferences 131.

Lastly, within the digital signal processor 106, the inverse operation of the transformation initially carried out 122 (MFT, FFT, WT, etc.) produces a digital signal without interferences 116.

Said digital signal 116 goes to a digital to analog converter 107 producing an analog signal free of RFI 117 which, as has been commented, by way of a second frequency converter 108, a signal 118 free of interferences is obtained, provided to be used by a GNSS receiver 300.

What is claimed is:

1. A method for detecting and eliminating radio frequency interferences in real time, characterized in that it comprises the stages of:
   a) converting an analog input signal from an antenna into a different frequency to that of the input signal, b) digitalizing said converted analog signal, c) detecting and eliminating the radio frequency interferences of said digitalized signal and obtaining a digitalized signal without interferences 116 where said stages of detecting and eliminating said interferences comprise:
   i) transforming the digitalized signal to a signal in the time domain, frequency domain, in the space of time and frequency, the space of time and scale or in the space of time, frequency and scale, ii) calculating the similarity of the signal to a variable with normal distribution of said digitalized signal, of said transformed signal or of both said digitalized signal and said transformed simultaneously, where a statistical normality test is used in said calculation, iii) estimating a threshold to be applied in the eliminating step where said threshold is a function of the scale of said transformed signal and/or of the result of said statistical test, iv) applying said estimated threshold to said transformed signal and eliminating or modifying the samples of said signal which exceed said threshold such that a digitalized signal without interferences is obtained, v) transforming, inversely to the first transformation, said digitalized signal without interferences, d) converting said digital signal without interferences to an analog signal without interferences and e) converting said analog signal without interferences to an analog signal in the same frequency as the initial analog signal coming from said antenna and providing it to be used in a GNSS receiver.

2. The method for detecting and eliminating radio frequency interferences in real time according to claim 1, where, prior to all the previous stages, it also comprises the stages of:
   a) pre-amplifying said analog input signal from said antenna, b) filtering said pre-amplified signal to allow only the working band of said pre-amplified signal to pass, c) amplifying said filtered frequencies of the pre-amplified signal where, said frequency conversion of the analog signal converts said amplified signal instead of said analog input signal from said antenna.

3. The method for detecting and eliminating radio frequency interferences in real time according to claim 1, where the conversion a) of frequency of the analog input signal is carried out at an intermediate frequency (IF) or in baseband (BB).

4. The method for detecting and eliminating radio frequency interferences in real-time according to claim 1, where the transformation method i) of the digitalized signal is multiresolution Fourier transform (MFT).

5. The method for detecting and eliminating radio frequency interferences in real time according to claim 1, where the statistical test which is used in the calculation ii) of the similarity of the signal to a variable with normal distribution is Kurtosis, Anderson-Darling or Chi-squared, or a combination of the same.

6. The method for detecting and eliminating radio frequency interferences in real time according to claim 1, where the scale of said transformed signal used in estimating said threshold is determined by calculating the accumulative histogram from either the modulus of the transformed signal or the instantaneous power of the same 130.

7. A system for detecting and eliminating radio frequency interferences in real time, characterized by the fact that it comprises:
   a) a first frequency converter of the analog signal provided for converting an analog input signal from an antenna to a different frequency to that of the input signal, b) an analog to digital converter provided for digitalizing said converted analog signal through said first frequency converter, c) a signal processing system provided for detecting and eliminating the radio frequency interferences of said digitalized signal and obtaining a digitalized signal without interferences, where said signal processing system comprises:
   i) transforming the digitalized signal to a signal in the time domain, frequency domain, in the space of time and frequency, the space of time and scale or in the space of time, frequency and scale, ii) calculating the similarity of said digitalized signal to a variable with normal distribution, of said transformed signal or of both said digitalized signal and said transformed simultaneously, where a statistical normality test is used in said calculation, iii) estimating a threshold to be applied in the elimination step where said threshold is a function of the scale of said transformed signal and/or of the result of said statistical test, iv) applying said estimated threshold to said transformed signal and eliminating or modifying the samples of said signal which exceed said threshold such that a digitalized signal without interferences is obtained, v) transforming, inversely to the first transformation, said digitalized signal without interferences, d) a digital-to-analog converter (DAC) provided for converting said digitalized signal without interferences to an analog signal and e) a second frequency converter of the analog signal provided for converting an analog signal without interferences to an analog signal in the same frequency as the initial analog signal coming from said antenna and providing it to be used in a GNSS receiver.

8. The system for detecting and eliminating radio frequency interferences in real time according to claim 7, where it also:

f) a pre-amplifier of the analog signal provided for amplifying said analog input signal from said antenna, g) a signal filter provided for allowing only some types of frequencies of said pre-amplified signal to pass, h) an amplifier provided for amplifying filtered frequencies of the pre-amplified signal where, said first frequency converter of the analog signal converts said amplified signal instead of said analog input signal from said antenna.

9. The system for detecting and eliminating radio frequency interferences in real time according to claim 7, where the first frequency converter includes a signal mixer provided for converting said analog input signal into an intermediate frequency (IF) signal.

10. The system for detecting and eliminating radio frequency interferences in real time according to claim 7, where the first frequency converter includes a quadrature demodulator provided for converting said analog input signal into a baseband (BB) signal.

11. The system for detecting and eliminating radio frequency interferences in real time according to claim 7, where said signal processor is a field-programmable gate array (FPGA) or a digital signal processor (DSP).

* * * * *